United States Patent
Moon et al.

[11] Patent Number: 5,946,124
[45] Date of Patent: Aug. 31, 1999

[54] LASER SCANNING UNIT HAVING A NOISE REDUCING PORTION

[75] Inventors: Kwang-ho Moon, Seoul; Hwan-young Choi, Kyonggi-do, both of Rep. of Korea

[73] Assignee: Samsung Electronics Co., Ltd., Kyungki-do, Rep. of Korea

[21] Appl. No.: 08/998,743

[22] Filed: Dec. 29, 1997

[30] Foreign Application Priority Data

Dec. 27, 1996 [KR] Rep. of Korea ............ 96-74201

[51] Int. Cl.⁶ .................................... G02B 26/08
[52] U.S. Cl. .................... 359/216; 359/217; 359/218; 359/219
[58] Field of Search ............... 359/216–219, 359/850, 855

[56] References Cited

U.S. PATENT DOCUMENTS 4,518,218  5/1985  Diepeveen ................ 359/217
5,024,496  6/1991  Otkawa ................... 359/218

*Primary Examiner*—James Phan
*Attorney, Agent, or Firm*—Sughrue, Mion, Zinn, Macpeak & Seas, PLLC

[57] ABSTRACT

A laser scanning unit includes an emitting portion for emitting laser beams, a deflecting portion having a plurality of mirror surfaces at its side portions to deflect the laser beams upon a predetermined position of a pickup surface by rotation of a predetermined speed, and a pickup portion for scanning the laser beams deflected by the deflecting portion into the pickup surface. A rotative noise reducing portion is formed at a plurality of edges formed by the plurality of adjacent mirror surfaces of a polygon mirror which acts as the deflecting portion. Preferably, the rotative noise reducing portion includes at least one air groove at the portion where the mirror surfaces connect, so as to be formed around the edges of the mirrors. Thus, it is possible to reduce the pressure difference between the mirror surfaces with the air groove, thereby reducing noise during rotation of the polygon mirror.

6 Claims, 3 Drawing Sheets

LASER SCANNING UNIT HAVING A NOISE REDUCING PORTION

BACKGROUND OF THE INVENTION

1. Field of the Invention

The present invention relates to a laser scanning unit. More particularly, the present invention is directed to a laser scanning unit for use in a laser printer and the like, in which a rotative noise reducing portion is formed at an edge portion where two mirror surfaces of a polygon mirror join, which deflects laser beams generated by a laser diode or a surface emitting laser diode into a pickup surface such as a photosensitive drum in a scanning direction, so that noise generated by rotation of the polygon mirror can be reduced.

2. Description of the Related Art

Recently, with the increasing popularity of laser printers, a variety of laser scanning units have been developed. The scanning unit is an optical system which scans laser beams upon a pickup surface to realize a desired picture on the pickup surface in a dotted form or to read out a manuscript through a picture. Generally, the laser scanning unit includes an emitting portion which emits laser beams, a deflecting portion which deflects laser beams in a scanning direction against the pickup surface, and a pickup portion which scans laser beams into the pickup surface in a dotted form.

A conventional laser scanning unit will be described with reference to the accompanying drawings.

As illustrated in FIGS. 2A and 2B, depending on the rotative direction of a polygon mirror which acts as a deflecting means, a high pressure area A (pressure surface portion illustrated by dots in FIG. 2a) is formed at a mirror surface in a rotative direction, around an edge 100 where two adjacent mirror surfaces a and b among polygonal mirror surfaces of the laser scanning unit join. A low pressure area B (minor pressure surface portion) is formed at the mirror surface opposite to the rotative direction. To achieve uniform pressure difference between the high pressure area and the low pressure area, as air flows into the low pressure area, a vortex flow having uneven fluid is formed at the low pressure area. As a result, the conventional laser scanning unit has a problem with respect to noise which occurs due to the vortex flow.

SUMMARY OF THE INVENTION

Accordingly, the present invention is directed to a laser scanning unit that substantially obviates one or more of the problems due to limitations and disadvantages of the related art.

An object of the present invention is to provide a laser scanning unit in which an air groove having a predetermined depth, a predetermined length and a predetermined area is formed at an edge portion where two mirror surfaces join, so that the pressure difference between a high pressure area and a low pressure area can be reduced, thereby reducing noise generated during rotation of a polygon mirror at high speed and normal speed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a laser scanning unit according to the present invention includes an emitting portion for emitting laser beams, a deflecting portion having a plurality of mirror surfaces at its side portion to deflect the laser beams into a predetermined position of a pickup surface by rotation of a predetermined speed, a pickup portion for scanning the laser beams deflected by the deflecting portion into the pickup surface, and a rotative noise reducing portion formed on the deflecting portion.

In the preferred embodiment of the present invention, the deflecting portion includes a polygon mirror. The rotative noise reducing portion is formed at a plurality of edges formed by a plurality of adjacent mirror surfaces of the polygon mirror. Desirably, the rotative noise reducing portion includes at least one air groove for connecting mirror surfaces at both sides of the edges of the polygon mirror with each other. More desirably, two air grooves are respectively formed at the edges. The air groove has a planar shaped section, a circular arc shaped section, or a v-shaped section.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A-1, 4A-2, 4B-1 and 4B-2 show prospective views illustrating modification examples of a section of an air groove of FIG. 3.

DETAILED DESCRIPTION OF THE PREFERRED EMBODIMENTS

Reference will now be made in detail to the preferred embodiments of the present invention, examples of which are illustrated in the accompanying drawings.

Figure 1:
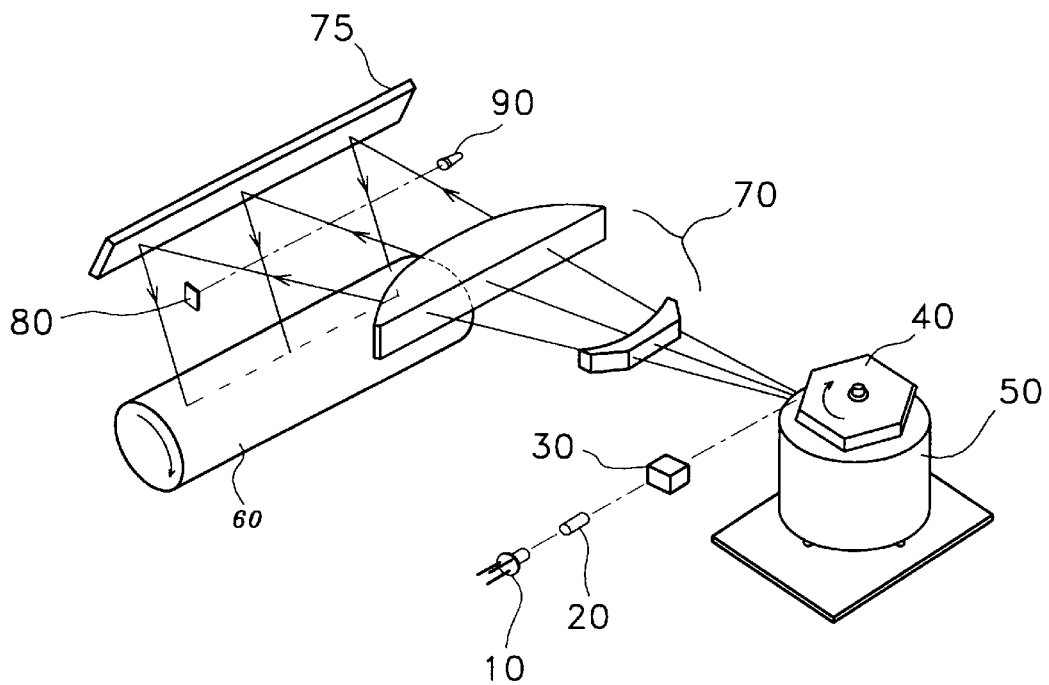
FIG. 1 is a perspective view illustrating a conventional laser scanning unit.
Figure 2A:
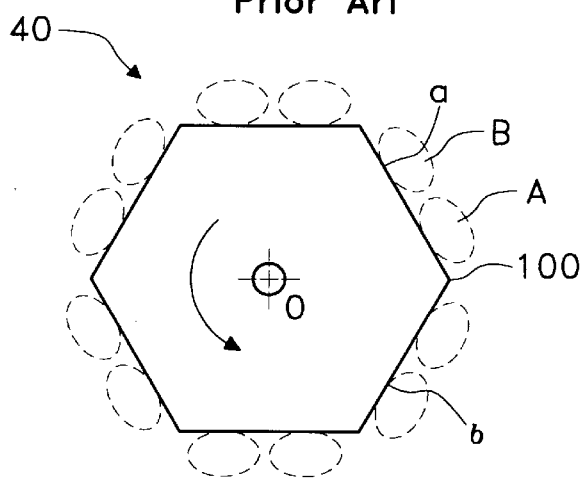
FIGS. 2A and 2B shows a high pressure area and a low pressure area formed in a polygon mirror of a laser scanning unit of FIG. 1.
Figure 2B:
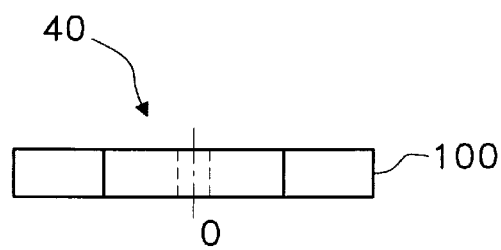

Referring to FIG. 1, a laser scanning unit includes a laser diode 10 or a surface emitting laser diode for emitting laser beams, a collimating lens 20 for advancing the laser beams in parallel to an optical axis, a cylinder lens 30 for focusing the laser beams into a feed direction, a polygon mirror 40 having a polygonal mirror surface to deflect the laser beams in a scanning direction, a motor 50 for rotating the polygon mirror 40, and a pickup lens group 70 for pickup of the laser beams on a surface of a photosensitive drum 60 serving as a pickup surface in a dotted form. In FIG. 1, reference numerals 75 and 80 denote reflecting mirrors, and a reference numeral 90 denotes an optical sensor.

In the aforementioned laser scanning unit, when the polygon mirror 40 rotates by the motor 50, the rotative angle of the mirror surfaces of the polygon mirror is varied, so that the laser beams are uniformly scanned into a horizontal direction, which is the scanning direction against the pickup surface. Also, the laser beams are scanned into the feed direction by rotating the photosensitive drum 60.

Figure 3A:
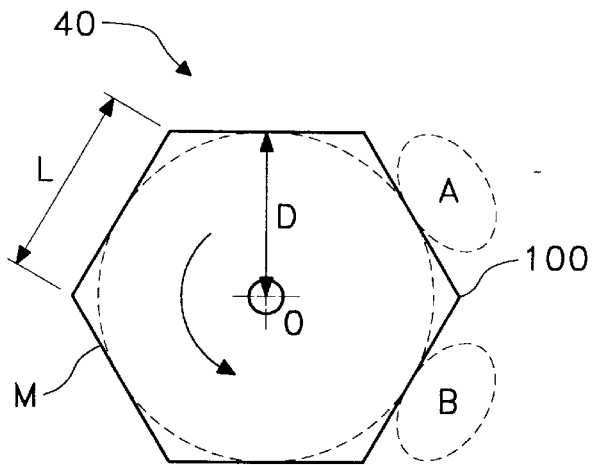
FIG. 3A is a plan view illustrating a polygon mirror of a laser scanning unit according to the present invention.
Figure 3B:
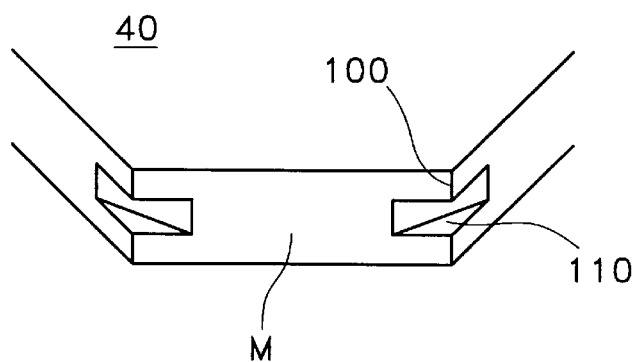
FIG. 3B is a perspective view illustrating a polygon mirror having one air groove at an edge.

Referring to FIG. 3B, an air groove 110 is formed at edges 100 where the mirror surfaces of the polygon mirror 40 join. The air groove acts as a deflecting means of the laser beams.

Referring to FIG. 3A, the polygon mirror 40 is a polyhedron having a predetermined height and consists of the mirror surfaces formed smoothly at respective sides to reflect the laser beams. The respective mirror surfaces M, each having a length L are formed along the perimeter of a circle having a diameter D and center coinciding with the center O of the polyhedron.

Referring to FIG. 3B, the edges 100 are formed at the portions where the mirror surfaces M join. The air groove 110 is formed around the edges 100 to connect the mirror surfaces with neighbouring mirror surfaces. In the embodiment of the present invention, one air groove 110 is formed at the respective edges 100.

Figure 3C:
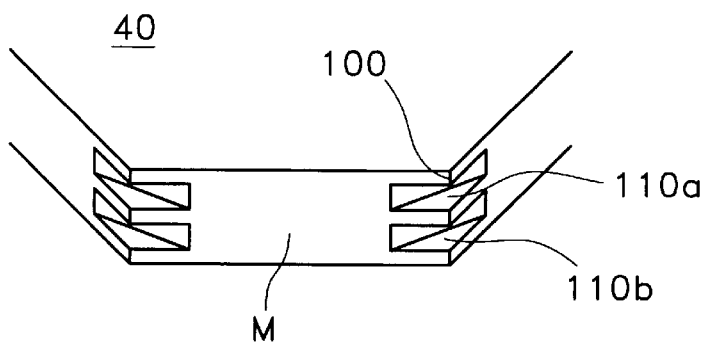
FIG. 3C is a perspective view illustrating a polygon mirror having two air grooves at an edge.

In another embodiment, as illustrated in FIG. 3C, two or more air grooves 110a and 110b may be formed at the respective edges 100.

The number of air grooves 110, the section shape and the section area depend on the rotative speed of the polygon mirror 40. Therefore, in the case that a plurality of the air grooves 110 are formed, it is possible to more precisely control the shape and area of the air groove as compared to the case having one air groove.

The operation of the aforementioned laser scanning unit according to the present invention will be described with reference to the accompanying drawings.

If the power source is applied to the motor 50, the polygon mirror 40 starts to rotate at a predetermined revolution per minute (rpm). A high pressure area A (pressure surface portion) is formed at the mirror surface in the rotative direction, around the edge of the polygon mirror 40. A low pressure area B (minor pressure surface portion) is formed at the mirror surface opposite the rotative direction. Under these circumstances, a fluid flows into the low pressure area B from the high pressure area A and a vortex of the fluid occurs. Such a vortex of the fluid gets larger relative to pressure difference between the high pressure area A and the low pressure area B. Some of the fluid adheres to the mirror surface in which the low pressure is formed.

As aforementioned, in the case that the vortex occurs or the fluid adheres to the mirror surface, noise having a predetermined frequency band occurs.

However, in the present invention, since the air groove 110 is formed at both sides of the mirror surface around the edge 100 of the polygon mirror 40 to be connected with the low pressure area B and the high pressure area A, the pressure difference between the mirror surfaces is reduced. Thus, at the air groove and the mirror surface in which the low pressure area B is formed, flaking of the fluid instead of adhesion of the fluid occurs, thereby reducing the vortex. As a result, the frequency band width is reduced, thereby reducing noise in the range of 1 dB to several dB.

In the embodiment illustrated in FIGS. 3B and 3C, the air groove has a planar shaped section.

Figures 1, 4A:
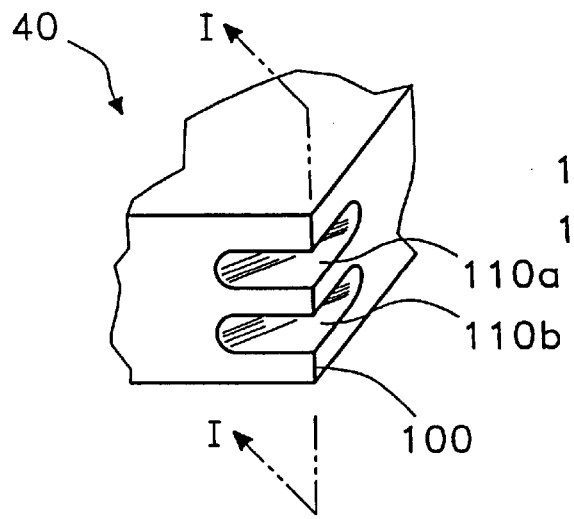
Figures 2, 4A:
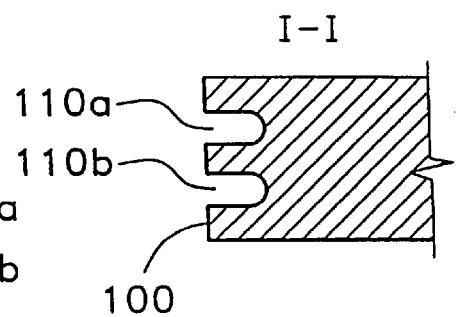

FIGS. 4A-1 and 4A-2 show an embodiment of the present invention illustrating the air grooves 110a, 110b having a circular arc shaped air groove taken along I–I'.

Figures 1, 4B:
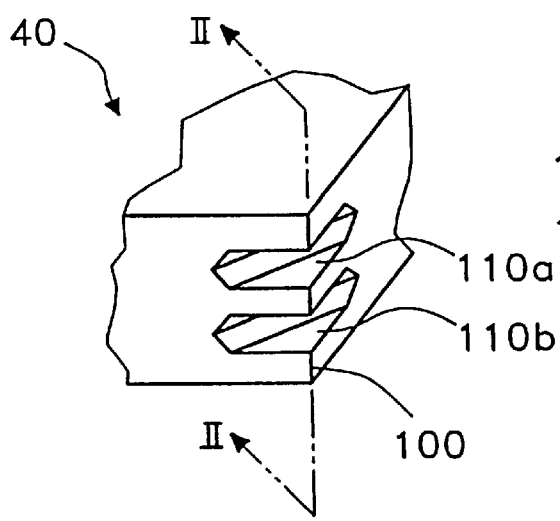
Figures 2, 4B:
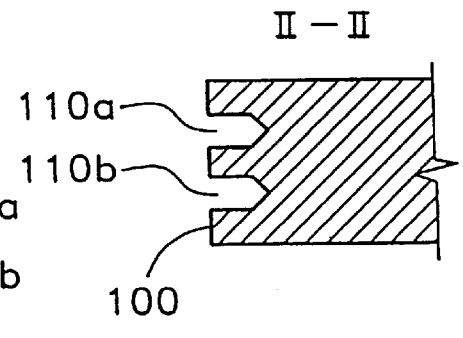

FIGS. 4B-1 and 4B-2 show another embodiment of the air grooves 110a, 110b having a v-shaped air groove taken along II–II'.

As aforementioned, the shape, the section area, and the number of the air grooves depends on the rotative speed of the polygon mirror 40. In this respect, it will be apparent to those skilled in the art that various modifications and variations can be made in the laser scanning unit according to the present invention without departing from the spirit or scope of the invention. Thus, it is intended that the present invention cover the modifications and variations of the invention provided they come within the scope of the appended claims and their equivalents.

What is claimed is:

1. A laser scanning unit, comprising:

an emitting means for emitting laser beams;

a deflecting means having a plurality of mirror surfaces at side portions thereof to deflect the laser beams upon a predetermined position of a pickup surface by rotating said deflecting means at a predetermined speed;

a pickup means for scanning the laser beams deflected by said deflecting means into the pickup surface; and a rotative noise reducing means formed on said deflecting means, wherein said rotative noise reducing means includes at least one air groove formed at the plurality of edges where said plurality of mirror surfaces join, said air groove extending in a direction of the rotation of said deflecting means so that said air groove is horizontal with respect to the height of said deflecting means.

2. The laser scanning unit as claimed in claim 1, wherein said deflecting means includes a polygon mirror, and said rotative noise reducing means is formed at a plurality of edges where said plurality of mirror surfaces join.

3. The laser scanning unit as claimed in claim 1, wherein said air groove has a v-shaped section, the v-shaped section extending along the direction of said air groove.

4. A laser scanning unit, comprising:

an emitting means for emitting laser beams;

a deflecting means having a plurality of mirror surfaces at side portions thereof to deflect the laser beams upon a predetermined position of a pickup surface by rotating said deflecting means at a predetermined speed;

a pickup means for scanning the laser beams deflected by said deflecting means into the pickup surface; and a rotative noise reducing means formed on said deflecting means, wherein said rotative noise reducing means includes at least one air groove formed at the plurality of edges where said plurality of mirror surfaces join and, wherein a pair of said air grooves is formed at the plurality of edges.

5. A laser scanning unit, comprising:

an emitting means for emitting laser beams;

a deflecting means having a plurality of mirror surfaces at side portions thereof to deflect the laser beams upon a predetermined position of a pickup surface by rotating said deflecting means at a predetermined speed;

a pickup means for scanning the laser beams deflected by said deflecting means into the pickup surface; and a rotative noise reducing means formed on said deflecting means, wherein said rotative noise reducing means includes at least one air groove formed at the plurality of edges where said plurality of mirror surfaces join and, wherein said air groove has a planar shaped section.

6. A laser scanning unit, comprising:

an emitting means for emitting laser beams;

a deflecting means having a plurality of mirror surfaces at side portions thereof to deflect the laser beams upon a predetermined position of a pickup surface by rotating said deflecting means at a predetermined speed;

a pickup means for scanning the laser beams deflected by said deflecting means into the pickup surface; and a rotative noise reducing means formed on said deflecting means, wherein said rotative noise reducing means includes at least one air groove formed at the plurality of edges where said plurality of mirror surfaces join and, wherein said air groove has a circular arc shaped section.

* * * * *